United States Patent
Dogterom et al.

(10) Patent No.: US 11,273,429 B2
(45) Date of Patent: Mar. 15, 2022

(54) FISCHER-TROPSCH CATALYST BODY

(71) Applicant: SHELL OIL COMPANY, Houston, TX (US)

(72) Inventors: Ronald Jan Dogterom, Amsterdam (NL); Gerard Pieter Van Der Laan, Amsterdam (NL); Abderrahmane Chettouf, Amsterdam (NL)

(73) Assignee: SHELL OIL COMPANY, Houston, TX (US)

(*) Notice: Subject to any disclaimer, the term of this patent is extended or adjusted under 35 U.S.C. 154(b) by 287 days.

(21) Appl. No.: 16/344,943

(22) PCT Filed: Oct. 27, 2017

(86) PCT No.: PCT/EP2017/077550
§ 371 (c)(1),
(2) Date: Apr. 25, 2019

(87) PCT Pub. No.: WO2018/078069
PCT Pub. Date: May 3, 2018

(65) Prior Publication Data
US 2019/0262802 A1    Aug. 29, 2019

(30) Foreign Application Priority Data
Oct. 27, 2016    (EP) .................................. 16195968

(51) Int. Cl.
B01J 23/75    (2006.01)
B01J 21/06    (2006.01)
B01J 35/02    (2006.01)
B01J 35/04    (2006.01)
B01J 35/10    (2006.01)
B01J 37/02    (2006.01)
B01J 37/03    (2006.01)
C10G 2/00    (2006.01)

(52) U.S. Cl.
CPC ............. B01J 23/75 (2013.01); B01J 21/063 (2013.01); B01J 35/023 (2013.01); B01J 35/04 (2013.01); B01J 35/10 (2013.01); B01J 37/0215 (2013.01); B01J 37/0225 (2013.01); B01J 37/038 (2013.01); C10G 2/332 (2013.01)

(58) Field of Classification Search
None
See application file for complete search history.

(56) References Cited

U.S. PATENT DOCUMENTS

| | | | |
|---|---|---|---|
| 4,409,131 A | 10/1983 | Fetchin | |
| 5,502,019 A | 3/1996 | Augustine et al. | |
| 5,783,604 A | 7/1998 | Garcia Nunez | |
| 5,783,607 A | 7/1998 | Chaumette et al. | |
| 5,863,856 A | 1/1999 | Mauldin | |
| 6,432,866 B1 * | 8/2002 | Tennent | B01J 23/28 502/180 |
| 7,563,745 B2 | 7/2009 | Hoek et al. | |
| 7,790,648 B2 | 9/2010 | Dogterom et al. | |
| 8,012,598 B2 | 9/2011 | Naumann et al. | |
| 8,865,613 B2 | 10/2014 | Mordkovich et al. | |
| 2014/0004259 A1 | 1/2014 | Walther et al. | |
| 2016/0214093 A1 | 7/2016 | Wang et al. | |

FOREIGN PATENT DOCUMENTS

| | | |
|---|---|---|
| CA | 1166655 A | 5/1984 |
| CN | 104258863 A | 1/2015 |
| EP | 2338592 A1 | 6/2011 |
| EP | 2341120 A1 | 7/2011 |
| WO | 9626006 A1 | 8/1996 |
| WO | 9811037 A1 | 3/1998 |
| WO | 0176734 A1 | 10/2001 |
| WO | 2010066648 A1 | 6/2010 |

OTHER PUBLICATIONS

International Search Report and Written Opinion received for PCT Patent Application No. PCT/EP2017/077550, dated Jan. 16, 2018, 9 pages.
Davis, "Overview of Reactors for Liquid Phase Fischer-Tropsch Synthesis", Catalysis Today, vol. 71, Issue No. 3-4, Jan. 15, 2002, pp. 249-300, XP055155566.
Fan, "Gas-Liquid-Solid Fluidization Engineering", Butterworths Series in Chemical Engineering, Chapter 4, 1989, pp. 199-202.
Mateeva et al., "Distributed Acoustic Sensing for Reservoir Monitoring with Vertical Seismic Profiling", Geophysical Prospecting, vol. 62, Issue No. 4, May 23, 2014, pp. 679-692, XP055231175.

* cited by examiner

*Primary Examiner* — Colin W. Slifka
(74) *Attorney, Agent, or Firm* — Shell Oil Company

(57) ABSTRACT

The present application relates to a Fischer-Tropsch catalyst body having an open-celled foam structure, said catalyst body comprising a substrate material and a catalytic active material or precursor thereof wherein:—The substrate material: • is a metal alloy or ceramic material; • having a surface roughness of 50 μm or more; • has an open-celled foam structure with at least 15 pores per inch; and—The catalytically active material or precursor thereof which: • is present on the surface of the substrate material; • comprises cobalt, iron, ruthenium or a combination thereof; and • comprises a catalyst support selected from titania, alumina or silica.

20 Claims, No Drawings

FISCHER-TROPSCH CATALYST BODY

CROSS REFERENCE TO EARLIER APPLICATION

The present application is a National Stage (§ 371) application of PCT/EP2017/077550, filed Oct. 27, 2017, which claims priority benefits of European Application No. 16195968.9, filed Oct. 27, 2016, the disclosure of which is incorporated by reference herein.

FIELD OF THE INVENTION

The present invention relates to a Fischer-Tropsch catalyst body having an open-celled foam structure and a process for producing normally gaseous, normally liquid, and optionally normally solid hydrocarbons from a gas mixture comprising hydrogen and carbon monoxide.

BACKGROUND TO THE INVENTION

The Fischer-Tropsch process can be used for the conversion of hydrocarbonaceous feed stocks into liquid and/or solid hydrocarbons. The feed stock (e.g. natural gas, associated gas and/or coal-bed methane, residual oil fractions, coal) is converted in a first step into a mixture of hydrogen and carbon monoxide (this mixture is often referred to as synthesis gas or syngas). The synthesis gas is then converted in a second step over a suitable catalyst at elevated temperature and pressure into predominantly paraffinic compounds ranging from methane to high molecular weight molecules comprising up to 200 carbon atoms, or, under particular circumstances, even more.

Numerous types of reactor systems have been developed for carrying out the Fischer-Tropsch reaction. For example, Fischer-Tropsch reactor systems include fixed bed reactors, especially multi tubular fixed bed reactors, fluidized bed reactors, such as entrained fluidized bed reactors and fixed fluidized bed reactors, and slurry bed reactors such as three-phase slurry bubble columns and ebullated bed reactors. The Fischer-Tropsch reaction is very exothermic and temperature sensitive with the result that careful temperature control is required to maintain optimum operation conditions and desired hydrocarbon product selectivity. Bearing in mind the very high heat of reaction which characterizes the Fischer-Tropsch reaction, the heat transfer characteristics and cooling mechanisms of a reactor are very important in order to remove heat efficiently from the reactor and avoid potential temperature runaways and obtain optimal product slate. The heat transfer performance of a fixed-bed reactor operated in trickle mode is limited because of the high gas hold up (low heat capacity), relatively low mass velocity and small catalyst particle size. If one attempts, however, to improve the heat transfer by increasing the gas velocity (and subsequently the reactor temperature), a higher CO conversion could be obtained, but an excessive pressure drop across the reactor may develop, which limits commercial viability. Increasing reactor capacity by increasing gas throughput and CO conversion may also result in increasing radial temperature gradients. For thermal stability and efficient heat removal the Fischer-Tropsch fixed-bed reactor tubes should have a diameter of less than 10 cm and preferably smaller.

The desired use of high activity catalysts in Fischer-Tropsch fixed-bed reactors makes the situation even more challenging. The limited heat transfer performance makes local runaways (hotspots) possible, which may result in local deactivation of the catalyst. In order to avoid runaway reaction the maximum temperature within the reactor must be limited. Moreover, the presence of temperature gradients in the radial and axial directions means that some of the catalyst is operating at sub-optimal conditions. Commercial fixed-bed and three-phase slurry reactors typically utilize boiling water to remove the heat of reaction. In the fixed-bed design, individual reactor tubes are located within a jacket containing water/steam. The heat of reaction raises the temperature of the catalyst bed within each tube. This thermal energy is transferred to the tube wall forcing the water in the surrounded jacket to boil. In the slurry design, cooling tubes are most conveniently placed within the slurry volume and heat is transferred from the liquid continuous matrix to the tube walls. The production of steam within the tubes provides the needed cooling. The steam in turn may be used for heating purposes or to drive a steam turbine.

The presence of a flowing reactant gas in a reactor being liquid-full improves the radial bed conductivity and the wall heat transfer coefficients leading to efficient heat removal and temperature control A potential limitation of the trickle bed system (as well as any of the fixed-bed designs) is the pressure drop associated with operating at high mass velocities. The gas-filled voidage (bed porosity) in fixed-beds (typically less than 0.50) and size and shape of the catalyst particles does not permit high mass velocities without excessive pressure drops. Consequently, the conversion rate per unit reactor volume is limited by heat removal and pressure drop. Increasing catalyst particle size and higher mass flow rates improve heat transfer rates for a given pressure drop. However, the loss of catalyst selectivity and lower catalyst efficiency may make this unattractive.

Three-phase slurry bubble column reactors potentially offer advantages over the fixed-bed design in terms of heat transfer performance. Such reactors typically incorporate small catalyst particles in a liquid continuous matrix. The synthesis gas is bubbled through, maintaining suspension of the catalyst particles and providing the reactants. The motion of the continuous liquid matrix promotes heat transfer to achieve a high commercial productivity. The catalyst particles are moving within a liquid continuous phase, resulting in efficient transfer of heat generated in the catalyst particles to the cooling surfaces. The large liquid inventory in the reactor provides a high thermal inertia, which helps prevent rapid temperature increases that can lead to thermal runaway.

SUMMARY OF THE INVENTION

It is an object of the present invention to provide for an improved catalyst.

It is an object of the present invention to provide for an improved process for producing normally gaseous, normally liquid, and optionally normally solid hydrocarbons.

The present invention provides for a Fischer-Tropsch catalyst body having an open-celled foam structure. Said catalyst body comprises a substrate material and a catalytic active material or precursor thereof wherein:

The substrate material:
is a metal alloy or ceramic material;
having a surface roughness 50 μm or more;
has an open-celled foam structure with at least 15 pores per inch; and The catalytically active material or precursor thereof:
is present on the surface of the substrate material;
comprises cobalt, iron, ruthenium or a combination thereof; and comprises a catalyst support selected from titania, alumina or silica.

DETAILED DESCRIPTION OF THE INVENTION

The present invention provides for a Fischer-Tropsch catalyst body having an open-celled foam structure. The substrate material is a metal alloy or ceramic material having a surface roughness of at least 50 μm. It further has an open-celled foam structure with at least 15 pores per inch.

With open-celled foam structure is meant that the adjacent cells (such as cavities) in the foam are connected with each other such that a fluid can flow from one cell to the other. Since adjacent cells in an open-celled foam are connected with each other a fluid can flow through a catalyst particle according to the present invention. With foam is also meant to include sponge structures. Open-celled foam structure does not include honeycombs and/or monoliths or any other forms which are fully closed in one or more directions. Preferably open structures are used, especially gauzes, sponges or woven structures, especially mats. The open structure in all directions support an almost undisturbed flow of gas and liquid. In that way corrective transport of gas and liquid is possible in all directions.

The pore density is expressed in pores per inch (ppi) or pores per cm (ppc). The pore density is provided by the manufactures of the foam material. These structures are commercially available. The foam material or foam structures may also be referred to as porous substrate material.

The foam structures suitable for the present invention may be obtained in accordance with US2014/004259. The surface roughness of the foam structures is at least 50 μm. In an aspect of the invention the surface roughness lies in the range of 50 to 200 μm. The surface roughness of the substrate material is achieved by the sintered powder particles on a smoother precursor foam. The surface roughness is determined by confocal laser spectroscopy. With surface roughness is meant that the surfaces defining the open celled structure have a texture. This allows for good adherence of the coating comprising the catalytically active component to the foam structure. The inventors have found that, surprisingly, the coating remains largely in place under the harsh conditions of a Fischer-Tropsch reaction. Hence, the surface is not defined by the circumference of the foam particle.

The surface roughness of the foam structures used in the present invention is not obtained by etching. Etching provides for a surface roughness smaller than that required for the present invention. Etching provides for a surface roughness in the Angstrom range. In case foam structures are used which have been roughened by etching an additional buffer layer is required or an adherence layer is required to make the make the catalytic layer adhere sufficiently to the structure. These additional layers have a different thermal expansion coefficient than the foam structure. This difference will result in cracking of the additional layer in case the layered structure is heated. This makes these foams unsuitable for application in exothermic reactions.

The surface roughness according to the present invention allows for the application of the catalytically active material directly on the foam structure. A benefit of this direct application is that it simplifies the coating of the foam structure. In addition, as the catalytically active material adheres directly to the foam structure, attrition during transport and use is decreased compared to etched foam structures.

The present inventors have found that with catalyst particles according to the present invention a high C5+ selectivity can be achieved in a Fischer-Tropsch reaction, even at low syngas pressure and high temperature. Hence the catalyst according to the present invention has an increased selectivity towards longer hydrocarbons as compared to prior art catalysts currently in use as Fischer Tropsch fixed-bed catalysts or Fischer Tropsch catalyst particles in slurry reactors. It was further found that good selectivity and CO conversion can be obtained over a wider range of H2/CO ratio of the synthesis gas than for prior art FT catalysts in fixed bed or conventional slurry reactors. The catalyst according to the present invention also allows for higher levels of inert compounds (such as N2) in the syngas. Advantageously, the less stringent requirements for the syngas allow for the application of upstream (of the FT reactor) installations (such as the synthesis gas manufacturing unit) meeting less stringent requirements. Such benefits are mainly due to very limited internal diffusion limitations and due to application of thin catalytic layer and high heat transfer coefficients.

The substrate material is selected from a metal alloy or ceramic material. The substrate material has at least 15 pores per inch. Such materials provide the catalyst particles with good structural strength while having a porous structure which allows for fluid to flow through the material and enough space to develop enough catalytically active materials. In case a metal alloy is used as the substrate material a catalyst body with good thermal conductivity is obtained.

The good thermal conductivity in combination with liquid full operation allows heat generated in the center of the reaction tube to be efficiently transported to the reactor tube wall both via its own conductivity as well as by transport of heat from the particle to the liquid and from the liquid to the tube wall. Heat is mainly transported out of the tubes by the liquid when it flows through the tube. This transport of heat reduces the risk of overheating of the catalyst particles which reduces the life span of the catalyst. It further limits the chance of a thermal runaway (uncontrolled heating up of the reactor).

The catalytically active material is present on the surface of the porous substrate material. This allows for good availability of the catalytically active material during a Fischer-Tropsch reaction both on the outside as inside of the catalyst body.

The catalyst body according to the present invention is capable of being held in a reactor tube for a hydrocarbon synthesis process in a three phase reactor. Since the catalyst bodies are held in a tube during the Fischer-Tropsch reaction they are prevented from entering the product stream. If the particle size is too small i.e. the particle size of particles used in conventional Fischer-Tropsch slurry reactors, the particles cannot be held in a reactor tube sufficiently to prevent some particles from leaving the reactor tube or the reactor. In prior art slurry reactors complicated filter systems are used to filter out catalyst particles from the product stream. Advantageously, for the present invention these complicated filter systems are not required. Hence the catalyst bodies according to the present invention also provide for a simplification of the reactors compared to conventional slurry reactors.

The catalyst bodies of the present invention are suitably fixed in the reactor. This may be done by fixing means, e.g. perforated plates, wires, pins, pipes, gazes, clamps, springs, weights placed on top of the catalyst bed, etc. The porous elements may be fixed against reactor walls and/or cooling tubes. Each element may be fixed separately or together with a number of elements. Especially when relatively small elements are used, the elements may be fixed in e.g. basket, containers etc. Very suitably they may be fixed using horizontal sieve plates or perforated plates extending over the whole diameter of the reactor. Separate elements may have means which fix two or more elements together, e.g. dovetails.

Fischer-Tropsch catalysts are known in the art, and typically include a Group VIII metal component, preferably cobalt, iron and/or ruthenium, more preferably cobalt and/or iron, most preferably cobalt.

In case the Fischer-Tropsch catalyst is used in a coal to liquids process an iron based catalyst may be used.

The catalytically active material comprises particles comprising the catalyst, a support/carrier material and optionally one or more promoters. The support/carrier material is preferably chosen from the group of porous inorganic refractory oxides, preferably alumina, silica, titania, zirconia or mixtures thereof.

The catalytically active material may be present together with one or more metal promoters or Co-catalysts. The promoters may be present as metals or as the metal oxide, depending upon the particular promoter concerned. Suitable promoters include oxides of metals from Groups IIA, IIIB, IVB, VB, VIB and/or VIIB of the Periodic Table, oxides of the lanthanides and/or the actinides. Preferably, the catalyst comprises at least one of an element in Group IVB, VB and/or VIIB of the Periodic Table, in particular titanium, zirconium, manganese and/or vanadium. As an alternative or in addition to the metal oxide promoter, the catalyst may comprise a metal promoter selected from Groups VIIIB and/or VIII of the Periodic Table. Preferred metal promoters include rhenium, platinum, ruthenium and palladium. A most suitable catalyst material comprises cobalt and zirconium as a promoter. Another most suitable catalyst comprises cobalt and manganese and/or vanadium as a promoter.

In an aspect of the present invention the catalytically active material is present as a layer which is in direct contact with the substrate material. Hence the catalytically active material is applied directly on the substrate material. With the surface roughness of at least 50 μm no intermediate layer is required to improve adherence of the catalytic layer to the substrate material.

In an aspect of the invention the catalytically active material is present as a layer in the Fischer-Tropsch catalyst particle, preferably as a thin layer of Cobalt based catalyst material. The thin layer preferably has a layer thickness in the range of 10-200, preferably 15-150 and more preferably 20-120 μm. The layer thickness results in the FT reaction to be non-diffusion limited. Advantageously, this results in a broad operating window with respect to H2/CO ratio of the syngas. Further, high concentrations of inert (like nitrogen) are possible while maintaining good activity and C5+ selectivity. The layer thickness may be determined by scanning electron microscopy.

General methods of preparing catalytically active materials and precursors thereof are known in the art, see for example U.S. Pat. No. 4,409,131, U.S. Pat. No. 5,783,607, U.S. Pat. No. 5,502,019, WO 0176734, CA 1166655, U.S. Pat. No. 5,863,856 and U.S. Pat. No. 5,783,604. These include preparation by co-precipitation and impregnation. Such processes could also include sudden temperature changing. Examples of preparing the catalyst body are provided in EP 2 341 120 and EP 2 338 592. These applications disclose methods of coating porous structures with a catalytically active material.

Within this range the catalyst layer is sufficiently thin to avoid diffusional mass transport limitation (i.e. decrease of CO and/or hydrogen partial pressure and/or unfavorable change of the hydrogen/carbon monoxide-ratio within the catalyst layer) of the syngas components within the catalyst layer. The thickness of the catalyst layer can be increased up to the onset of mass transport limitation. The upper limit of the thickness of the catalyst layer depends on the diffusional mass transport limitation. This provides additional freedom in comparison to a slurry reactor, where the size/density of the slurry catalyst particles imposes an upper limit to the size (with too high a settling velocity resulting from a particle size which is too large and which causes non-uniform catalyst hold-up along the height of the reactor). The catalyst layer is preferably sufficiently thin to avoid diffusional mass transport limitation (decrease of CO and/or hydrogen partial pressure and/or unfavorable change of the hydrogen/carbon monoxide-ratio within the catalyst layer) of the syngas components within the catalyst material layer.

In an embodiment of the present invention the catalytically active material is present in an amount of 5-30, preferably 7-25 and most preferred 13-22 vol % of the total volume of the Fischer-Tropsch catalyst particle.

In an embodiment of the present invention the thin layer of catalytically active material is deposited on the surface by means of vacuum wash coating. Vacuum wash coating allows for good distribution of the catalytically active material over the surface of the substrate material. In an embodiment of the present invention the catalytically active material is adhered to and substantially covers the substrate surface (material). With surface is meant both the outside of a substrate material as well as the surfaces defining the open cells in the substrate particle.

The catalytically active material comprises particles of a catalytically active material. These particles can comprise at least one of the catalysts as described previously, optionally one or more promoters and a carrier material.

In an embodiment of the present invention the Fischer-Tropsch catalyst body has a particle size of at least 5 mm. In the present application with size of the catalyst body is meant the largest distance measurable along a straight line within a particle. The volume of a particle is preferably at least about 0.1 cm3 in size, preferably at least 0.3 cm3. Particles of these sizes and/or volumes allow for the particles to be held in reactor tubes in a Fischer-Tropsch reactor.

Preferably the particles are shaped such that a good stacking of the particles is achieved after loading a reactor tube with said catalyst particles. With good stacking is meant that the particles are positioned/stacked such that the voidage between particles is limited. By limiting the voidage between the particles, the contact of syngas moving through a reactor tube with the catalyst particles will increase. The voidage preferably ranges from 25 to 50 vol %, more preferably from 30 to 40 vol % and most preferred from 33 to 36 vol %. This will increase the efficiency of the conversion of syngas into Fischer-Tropsch product. The preferred shapes are disc/cylinder-shaped, sphere-, rectangular-, squared- or polyhedral (including semi regular and regular polyhedral) shaped. These shapes include hexagon, dodecahedron, icosahedron, cuboctahedron or icosidodecahedron shaped.

In an embodiment of the present invention the substrate material of the Fischer-Tropsch catalyst particle has a rigidity of at least 0.7 MPa, preferably at least 1.0 MPa, as measured with a compression strength test. The particles are loaded in the tubes by dumping them in the reactor tubes. These tubes can have a length of several meters. An advantage of substrate material having at least such rigidity is that the particles in the lower part of the tube (carrying the weight of the particles higher up) will not or will substantially not deform due to this weight. The compression strength test is conducted with Dillon TC2 Quantrol i-series controlled by computer. Disc shaped foam structures with known dimensions are provided after which a force is applied.

The inventors have further found that catalyst bodies according to the present invention having such a rigidity form little fine particles when they are dumped into a reactor tube. Since the reactor tubes are several meters in length the particles will fall several meters into the reactor. The dumping of particles having a rigidity of less than 0.7 MPa causes the particles to break. This breaking generates next to larger particles also fine particles. These fine particles will move freely through the reactor tube during operation and will pollute the production stream.

In an embodiment of the present invention the substrate material of the Fischer-Tropsch catalyst body has a voidage of 70-96 vol %, more preferably 80-96 vol % and most preferably 85-96 vol %. Substrate material having such a voidage has good flow through properties meaning that liquid can flow through the open celled foam structure when used in a reactor according to the invention. The flow through is still good after coating the material with the catalytically active material. A further advantage is that these structures are very light compared to prior art catalysts, which is beneficial for transporting and loading a reactor tube with the catalyst bodies. The voidage can be determined by: establishing the density of the foam material and therefrom the volume of the foam material, determining the volume of the (total) foam structure (i.e. foam material and voidage combined) and distracting the volume of the foam material from the volume of the total foam structure in order to obtain the voidage.

Preferably the metal substrate material comprises or consists of an alloy comprising two or more of Ni, Fe, Al and Cr, stainless steel or combinations thereof. Preferably the ceramic substrate material comprises or consists of $\alpha$-Al2O3, SiO2-$\alpha$-Al2O3, TiO2-$\alpha$-Al2O3, ZrO2 (Mg and Y stabilized) or combinations thereof. These materials provide for good thermal conductivity and allow for good adherence of the catalytic material to said structure. Useful foam structures are also disclosed in U.S. Pat. No. 8,012,598.

The present invention further relates to a process for producing normally gaseous, normally liquid, and optionally normally solid hydrocarbons from a gas mixture comprising hydrogen and carbon monoxide, preferable synthesis gas, in a three-phase reactor. The method comprises the steps of:
  Providing Fischer-Tropsch catalyst bodies according to any one of the preceding claims to at least one reactor tube in a three phase Fischer-Tropsch reactor;
  Optionally an activation step of the catalyst particles;
  Providing a liquid to the reactor;
  Providing to the Fischer-Tropsch catalyst bodies having an open-celled foam structure a gas mixture comprising carbon monoxide and hydrogen in order for the synthesis to occur while the Fischer-Tropsch catalyst particles remain stationary in the reactor tubes;
  Obtaining a synthesis product from the reactor comprising the normally gaseous, normally liquid, and optionally normally solid hydrocarbons.

The normally gaseous, normally liquid, and normally solid hydrocarbons in which the synthesis gas is to be converted are hydrocarbons that are respectively gaseous, liquid and solid at room temperature at about 1 atm.

The liquid is preferably a paraffinic Fischer-Tropsch wax. Other options are commercially available SX70 (Shell).

The method for producing normally gaseous, normally liquid, and optionally normally solid hydrocarbons from synthesis gas (syngas) has a high C5+ selectivity and good conversion rate. In an embodiment of the present invention the Fischer-Tropsch catalyst particles are according to the present invention or obtainable with the method according to the present invention. Application of these catalyst particles has the advantages as described previously.

In case the Fischer-Tropsch catalyst bodies are provided to the reactor as precursors, the catalyst first needs to be activated. In that case the catalyst precursor is subjected to a reduction stage. The reduction stage comprises a step of bringing the catalyst precursor into contact with a flow of hydrogen. By applying hydrogen to the precursor cobalt is reduced to its metallic state.

In an embodiment of the present invention the method comprises prior to the step of providing a liquid to the reactor, at least an activation phase. The Fischer-Tropsch synthesis is preferably carried out at a temperature in the range from 125 to 350° C., more preferably 175 to 275° C., most preferably 200 to 260° C. The pressure preferably ranges from 5 to 150 bar abs., more preferably from 5 to 80 bar abs.

Hydrogen and carbon monoxide (synthesis gas) is typically fed to the slurry reactor at a molar ratio in the range from 0.4 to 2.5. Preferably, the hydrogen to carbon monoxide molar ratio is in the range from 1.0 to 2.5.

The conditions to be used in the process according to the invention very much resemble the conditions in a two phase bubble column reactor. The hydrodynamic properties of the reactor according to the invention are very similar to a gas/liquid bubble column reactor. This is obtained by the very open structure of the catalyst structure, especially the very open structure within the catalyst elements in all directions. The pressure drop of the reactor according to the invention will be the static pressure of the reactor plus 2 bar, preferably the static pressure plus 1 bar, more preferably the static pressure plus 0.5 bar. This is more or less equivalent to a (slurry) bubble column.

The gaseous hourly space velocity, may vary within wide ranges and is typically in the range from 500 to 20,000 Nl/l/h preferably in the range from 700 to 10,000 Nl/l/h (with reference to the volume of porous catalyst elements and the spaces there in-between).

Preferably, the superficial gas velocity of the synthesis gas is in the range from 0.5 to 50 cm/sec, preferably in the range from 5 to 35 cm/sec, more preferably from 10 to 30 cm/sec, with reference to the cross section of the catalyst structure (i.e. the cross section of the reactor minus the cross section occupied by the cooling tubes and any other internal components). The Peclet number of the gas phase is suitably at least 0.1 m²/s, preferably 0.2 m2/s, more preferably 0.5 m²/s. The Peclet number can be calculated from the dispersion coefficient of the gas phase, which dispersion coefficient can be measured for instance by using radioactive tracer experiments. See for instance L-S. Fan, Gas-Liquid-Solid Fluidization Engineering (1989), Chapter 4. In the case that the Peclet number is too low, the slurry height may be increased and/or the gas velocity may be increased. Compartmentalization of the reactor is a further possibility. The reaction is preferably carried out in the coalesced bubble regime. This regime will occur at superficial gas velocities of at least 7 cm/s, preferably 10 cm/s, at column diameter of at least 25 cm, preferably at least 40 cm/s.

Typically, the superficial liquid velocity is kept in the range from 0.001 to 4.00 cm/sec, including liquid production from the Fischer-Tropsch reaction. It will be appreciated that the preferred range may depend on the preferred mode of operation.

According to one preferred embodiment, the superficial liquid velocity is kept in the range from 0.005 to 1.0 cm/sec.

The present invention relates to a three phase Fischer-Tropsch reactor which comprises one or more reactor tubes, wherein the reactor tubes comprise Fischer-Tropsch catalyst particles having an open-celled foam structure, preferably said catalyst particles are according to the present invention or obtainable with the method according to the present invention. The catalyst particles are provided such that the particles remain stationary during operation of the reactor. This can be achieved, for example, by applying weights to the top of the particles stacked in the reactor tubes.

It is observed that the three phase reactor according to the present invention comprises one stationary phase (the catalyst structure being held in one or more reactor tubes) and two mobile phases (the gas phase and the liquid phase). The liquid phase is a continuous phase (i.e. the reactor will usually be filled up for a substantial part (e.g. at least 25 vol %) with liquid. The liquid phase is preferably a paraffinic Fischer-Tropsch wax. Alternatively liquids such SX70 (Shell) can be used. The gas phase is a discontinuous phase, i.e. it is made up of large amounts of smaller and larger gas bubbles.

The synthesis gas is introduced at or near the bottom of the reactor. It may be introduced at one or more places. Preferably more introduction points are used in larger reactors. Separate spargers may be used. In general 1-4 spargers are used per $m^2$ reactor diameter. Also one or more perforated plates can also be used. Preferably all syngas is introduced in the reactor at or near the bottom. It is preferred to introduce all synthesis gas below the catalyst structure. Products are removed from the reactor. One or more gas outlets can be used at or near the top of the reactor, these outlets communicating with the freeboard zone if present. The liquid product may be removed directly from the liquid zone.

In one embodiment, the reactor of the present invention comprises porous bodies of which more than 95 weight % (wt %), more preferably more than 99 wt %, most preferably more than 99.9 wt %, has a size in the range of between 1 mm to 50 mm, preferably 1 mm to 30 mm, calculated on the total weight of the porous bodies in the reactor.

The appended claims form an integral part of this description by way of this reference. One or more of the aspects and/or embodiments described above may be combined.

EXAMPLES

Experiment 1 (Invention)

Foam structures obtained in accordance with US2014/004259 were coated with a slurry by means of vacuum coating.

The slurry for coating the structures is prepared by preparing a water based mixture containing all base ingredients, being Co and titania.

A tube is provided with means to keep the structures in place in the tube. The lower part of the tube is provided with a mesh on which the catalyst particles are dumped. On top of the catalyst particles a weight is applied to keep the particles in place during operation. After reduction, oxidation and reduction, the reactor was subsequently filled with liquid wax. Subsequently synthesis gas is introduced in the bottom of the reactor.

The reactor was operated under differential conditions. The different conditions at which the reactor is operated are listed in the Table 1. The H2/CO ratio is the average value between inlet and outlet of the reactor. Examples I to IV and VI show the results of experiments conducted with different H2 to CO ratio and under different temperatures. In example V the inert pressure is 26 bar whereas the inert pressure of the other examples is 13 or 14 bar.

The C5+ selectivity is expressed in weight % and STY is defined as amount of hydrocarbon C1+ produced in gram per liter of reactor per hour. As such, inter and intra porosity is included in the calculation. The external bed porosity (between loaded structures) was 36%.

TABLE 1

| Condition | I | II | III | IV | V | VI |
| --- | --- | --- | --- | --- | --- | --- |
| Total pressure (bar) | 36 | 36 | 36 | 36 | 36 | 36 |
| Syngas Pressure (bar) | 22 | 23 | 23 | 22 | 10 | 23 |
| Temperature (° C.) | 210 | 220 | 229 | 217 | 220 | 220 |
| H2/CO [mol/mol] | 1.4 | 1.4 | 1.4 | 2.0 | 1.5 | 1.0 |
| C5+ selectivity (wt %) | 93.9 | 93.6 | 92.7 | 87.3 | 92.8 | 90.6 |
| STY (g/L_reactor/hr) | 75 | 115 | 145 | 110 | 63 | 97 |

From Table 1 it may be concluded that the catalyst bodies according to the invention are good Fischer-Tropsch catalysts.

While the invention has been described in terms of what are presently considered to be the most practical and preferred embodiments, it is to be understood that the disclosure need not be limited to the disclosed embodiments. It is intended to cover various modifications, combinations and similar arrangements included within the spirit and scope of the claims, the scope of which should be accorded the broadest interpretation so as to encompass all such modifications and similar structures. The present disclosure includes any and all embodiments of the following claims.

It should also be understood that a variety of changes may be made without departing from the essence of the invention. Such changes are also implicitly included in the description. They still fall within the scope of this invention. It should be understood that this disclosure is intended to yield a patent covering numerous aspects of the invention both independently and as an overall system and in both method and apparatus modes.

Any patents, publications, or other references mentioned in this application for patent are hereby incorporated by reference. In addition, as to each term used, it should be understood that unless its utilization in this application is inconsistent with such interpretation, common dictionary definitions should be understood as incorporated for each term and all definitions, alternative terms, and synonyms such as contained in at least one of a standard technical dictionary recognized by artisans.

What is claimed is:

1. A Fischer-Tropsch catalyst body having an open-celled foam structure, said catalyst body comprising a substrate material and a catalytic active material or precursor thereof wherein:
   the substrate material:
      is a metal alloy or ceramic material;
      having a surface roughness of 50 µm or more;
      has an open-celled foam structure with at least 15 pores per inch; and
   the catalytically active material or precursor thereof which:
      is present on the surface of the substrate material;

comprises cobalt, iron, ruthenium or a combination thereof; and comprises a catalyst support selected from titania, alumina or silica.

2. The Fischer-Tropsch catalyst body according to claim 1, wherein the catalytically active material is present as a layer which is in direct contact with the substrate material; and wherein the catalytically active material or precursor thereof are particles comprising cobalt, iron, ruthenium or a combination thereof; and a catalyst support selected from titania, alumina or silica.

3. The Fischer-Tropsch catalyst body according to claim 1, wherein the catalytically active material or precursor thereof, is a Cobalt based catalyst material.

4. The Fischer-Tropsch catalyst body according to claim 3, wherein the catalytically active material or precursor thereof has a layer thickness in a range of from 10 to 200 µm.

5. The Fischer-Tropsch catalyst body according to claim 1, wherein 5-30 vol % of the FT catalyst body is catalytic active material.

6. The Fischer-Tropsch catalyst body according to claim 2, wherein the layer is deposited on the surface by means of vacuum wash coating.

7. The Fischer-Tropsch catalyst body according to claim 1, wherein the catalyst body is disc/cylinder-shaped, sphere-, rectangular-, squared- or polyhedral shaped.

8. The Fischer-Tropsch catalyst body according to claim 7, wherein the catalyst body has a particle size of at least 5 mm.

9. The Fischer-Tropsch catalyst body according to claim 1, wherein the substrate material has a rigidity of at least 0.7 MPa as measured with compression strength tests.

10. The Fischer-Tropsch catalyst body according to claim 1, wherein the catalytically active material is adhered to and substantially covers the substrate material.

11. The Fischer-Tropsch catalyst body according to claim 1, wherein the substrate material has a voidage of 70-96 vol.

12. A process for producing normally gaseous, normally liquid in a three-phase reactor comprising the steps of:

providing a Fischer-Tropsch catalyst body comprising a substrate material and a catalytic active material or precursor thereof to at least one reactor tube in a three phase Fischer-Tropsch reactor;

wherein the substrate material:
is a metal alloy or ceramic material;
having a surface roughness of 50 µm or more;
has a open-celled foam structure with at least 15 pores per inch; and wherein the catalytically active material or precursor thereof which:
is present on the surface of the substrate material;
comprises cobalt, iron, ruthenium or a combination thereof; and
comprises a catalyst support selected from titania, alumina or silica;

providing a liquid to the reactor;

providing to the Fischer-Tropsch catalyst body a gas mixture comprising carbon monoxide and hydrogen in order for the synthesis to occur while the Fischer-Tropsch catalyst body remains stationary in the reactor tubes;

obtaining a synthesis product from the reactor comprising the normally gaseous, normally liquid, and optionally normally solid hydrocarbons.

13. The process according to claim 12, wherein the hydrogen and carbon monoxide molar ratio of the synthesis gas is in the range from 0.4 to 2.5.

14. The process according to claim 12, wherein the gaseous hourly space velocity is in the range from 500 to 20,000 Nl/l/h.

15. The process according to claim 12, wherein the process is carried out at a temperature in the range of from 125 to 150° C. and a pressure of from 5 to 150 bar abs.

16. The process according to claim 12, wherein the synthesis product is withdrawn from the reactor by withdrawing liquid medium.

17. The process according to claim 12, wherein a gas mixture is withdrawn from the reactor.

18. The process according to claim 12, wherein the hydrogen and carbon monoxide molar ratio of the synthesis gas is in the range from 1.0 to 2.4.

19. The process according to claim 12, wherein the process is carried out at a temperature in the range of from 175 to 275° C.

20. The process according to claim 12, wherein the process is carried out at a pressure in the range of from 5 to 80 bar abs.

* * * * *